Figure 1:
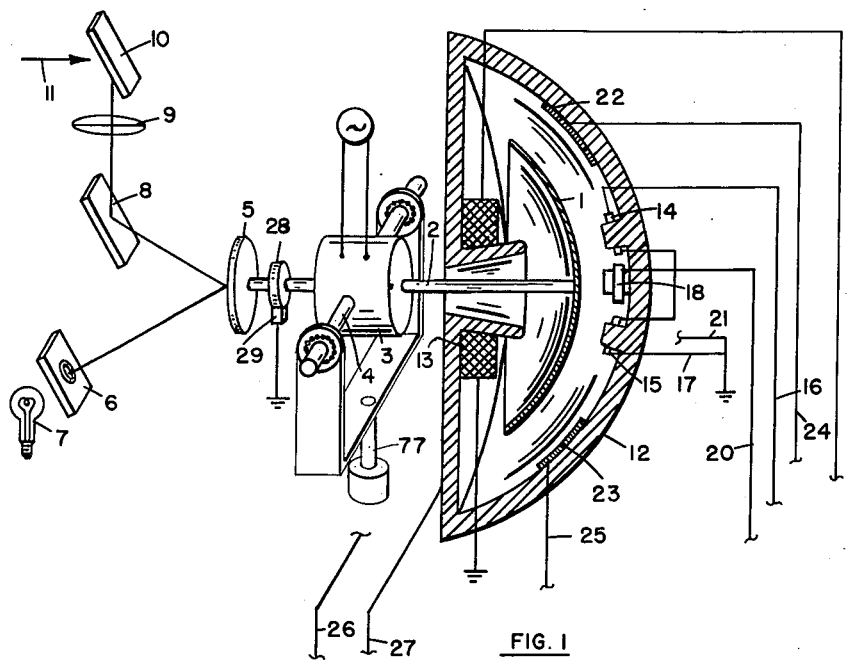

May 8, 1962  R. G. SHELLEY  3,034,116
FIRE CONTROL SYSTEM
Filed May 29, 1956  2 Sheets-Sheet 1

INVENTOR.
RULON G. SHELLEY
BY
William R. Lane
ATTORNEY

May 8, 1962 R. G. SHELLEY 3,034,116
FIRE CONTROL SYSTEM
Filed May 29, 1956 2 Sheets-Sheet 2

INVENTOR.
RULON G. SHELLEY
BY William R. Lane
ATTORNEY

United States Patent Office 3,034,116
Patented May 8, 1962

3,034,116
FIRE CONTROL SYSTEM
Rulon G. Shelley, Downey, Calif., assignor to
North American Aviation, Inc.
Filed May 29, 1956, Ser. No. 588,156
15 Claims. (Cl. 343—7)

This invention is a fire control system in which a gyroscopic sight system is interconnected with a radar. This device provides an all-weather fire control system having improved tracking characteristics.

A common type of sighthead is one which includes a gyroscope which disturbs a reticle off to a lead angle dependent on the turning rate of the gyroscope case, or the structure to which the sight is connected. In addition, the gyroscopic sighthead may be controlled in its lead angle by electrical signals which represent functions of range, gravity drop and other information concerning the fire control problem.

Radar systems capable of sensing and providing signals indicating the angular errors of the target relative to the boresight axis of the antenna are well-known within the art. The receiver provides signals indicating the elevation error and azimuth error of the radar antenna. It is proposed herein that an all-weather capability be provided by interconnection between the gyroscopic sighthead and a radar system. An added computer is desirable in order to most advantageously use the radar signals in the sighthead.

An advantage which can be gained from such a combination is the greater stability of the fire control system. In addition, the deflection of the gyroscope can then be influenced by electrical signals provided by a computer which receives information from a radar system. The time response in such a system is better than in a solely optical gyrosight system in which the lead angle is determined by the turning rate of the case and the restraint on the gyro.

Although it may be difficult to "fly the error dot" of a radar system so as to track a target correctly and, also, it may be difficult to put the reticle of a sighthead on the target, by the device of the invention, the pilot is better able to accomplish both of these operations. This is accomplished by improvement of the dynamic characteristics of the sighthead and the radar system.

It is an object of this invention to provide an improved optical tracking fire control system.

It is also an object of this invention to provide an improved all-weather fire control system.

It is still another object of this invention to provide a fire control system with improved dynamic characteristics.

It is still another object of this invention to provide a gyroscopic sighthead system interconnected with a radar system.

It is still another object of this invention to provide an error stabilized gyroscopic sighthead.

A still further object of this invention is to provide a gyroscopic sight system having improved time response.

A still further object of this invention is to provide a gyroscopic sighthead receiving radar range and angular error signals.

Another object of this invention is to provide a fire control system in which a gyroscopic sighthead provides angle signals to a radar system and receives range and error signals from the radar system.

Figure 2:
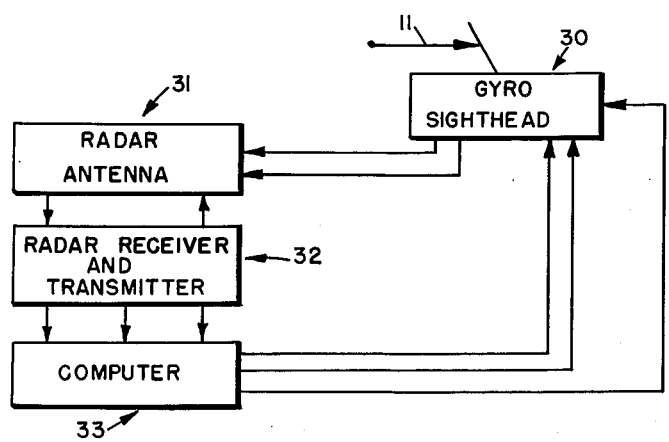
Figure 3:
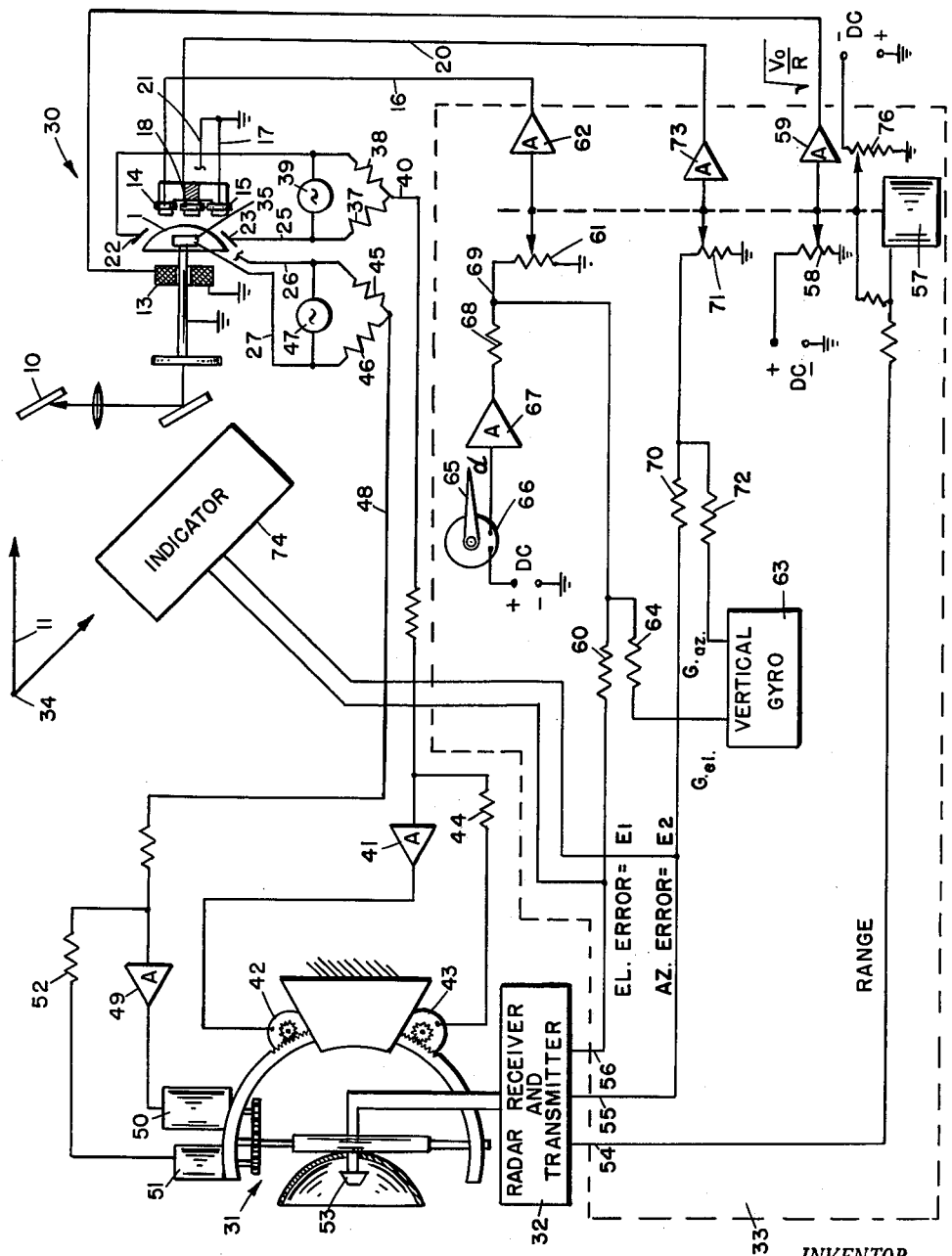

Other objects of invention will become apparent from the following description taken in connection with the accompanying drawings, in which:

FIG. 1 is a gyro computing sighthead, shown partially in section;
FIG. 2 is a block diagram illustrating the flow of information between the gyro computing sighthead and the radar unit and the computer; and
FIG. 3 is a schematic diagram of the device of the invention showing the interrelation between the gyro computing sighthead, the radar antenna, the radar receiver and transmitter, and various computing elements of the fire control system.

Referring now to FIG. 1, which illustrates a gyro computing sighthead, a gyro rotor 1 is connected to shaft 2 and caused to be rotated at constant speed by motor 3, which is mounted for rotation about shaft 4, providing a mounting known as a Hooke's joint for shaft 2 and rotor 1. In consequence, shaft 2 may rotate about its own axis and also rotate about the axis of shaft 4 and also about shaft 77. Rotor 1 is an eddy-current dome and acts as a gyroscope. Flat circular mirror 5 is mounted on the end of shaft 2. A reticle plate 6 is located in front of a small lamp 7 and casts a reticle on the surface of flat mirror 5 which is reflected to plate 8 through lens 9 and onto transparent plate 10. A pilot looking along arrow 11 through plate 10 at a target also sees the projection of the reticle on plate 10. As this sighthead is caused to turn and follow a target, the gyroscope rotor 1 deflects, causing mirror 5 to deflect; and the reticle on plate 10 disturbs off to a lead angle depending first on the angular velocity of the turn. It may be seen that as gyroscope rotor 1 deflects upwardly, for example, mirror 5 deflects downwardly. Thus, while the spin axis of the gyroscope rotor 1 lags the angular velocity of the longitudinal axis of the airframe in elevation and azimuth, the optical portion of the sighthead causes the projected reticle to lead the angular velocity of the airframe. In this way, a lead angle is obtained from a gyroscope which is lagging. Surrounding rotor 1 is a ferromagnetic case 12. A range coil 13 is utilized to induce a magnetic field in case 12. Rotor 1, being a conductive type disc and being disposed in the air gap of ferromagnetic case 12, has currents induced therein. The greater the current flowing in range coil 13 (indicating a greater range), the less deflection occurs in gyro rotor 1, consequently, the smaller the lead angle of the reticle projected on plate 10. Consequently the "deflection response" of the gyro may thus be controlled in accordance with an electrical signal representing range. This device is known in the art as an eddy-current dome gyro. Additional vertical deflection coils for certain corrections are indicated at 14 and 15 and the output lines are 16 and 17. A similar pair of deflection poles 18 and 19 (not shown) are located at right angles to poles 14 and 15 so as to deflect in the horizontal direction. The output lines of poles 18 and 19 are indicated at 20 and 21.

In order to provide electrical signals as to the deflection of gyro rotor 1, capacitance plates 22 and 23 are located on case 1. The output connections of these capacitive plates are lines 24 and 25. These plates determine the deflection in elevation of the rotor 1. A similar pair of plates located at right angles to these plates determine the deflection in azimuth and the outputs are indicated electrically on output lines 26 and 27. Rotor 1 provides the other plate of a capacitance and is connected through shaft 2, slip ring 28 and brush 29, to ground. Thus, it is possible to control the rotor deflection according to a signal which is a function of range, to electrically deflect rotor 1 in elevation or azimuth according to computed signals and also to provide electrical signals indicating the amount of deflection in elevation or azimuth.

Referring now to FIG. 2, a block diagram illustrates the interconnection between the gyro computing sighthead, the radar system, and a computer. The pickoff signals indicating the deflection of the gyroscope are received from the gyroscope sighthead 30 and sent to drive the radar antenna 31. Thus, the radar antenna is slaved to follow in proportion, the deflection of the gyroscopic sighthead. That is, when a lead angle is introduced by the gyroscope optics, the radar antenna also has the same lead angle. The spin axis of the gyroscope rotor itself may actually be lagging the longitudinal axis of the aircraft. However, at this time the sighthead reticle and the radar antenna are both leading. Block 32 illustrates the radar receiver and transmitter. An outgoing signal is sent to the radar antenna which transmits it. The return signal is received by the radar antenna 31 and passed to the radar receiver 32. The output signals of the radar receiver are sent to computer 33 which provides a signal which is a function of range and deflection signals to precess the gyroscope in the gyroscopic computing sighthead 30.

This device accomplishes the slaving of the radar antenna to the optical sighthead and, in addition, the control of the deflection of the gyroscope in the sighthead according to the range and azimuth and elevation error information provided by the radar. Such azimuth and elevation error signals from the radar are used to torque the gyroscope so as to cause it to precess in a direction to reduce the amount of the deflection of the gyroscope. The servo loop obtained by the gyroscopic sighthead and the radar is, of course, made stable and the loop gain is not such as to create instability. The radar attempts to speed up the reaction of the gyroscope to follow the target, but the gyroscope, which cannot respond immediately, integrates or "smooths" out the radar signal while responding to it. Thus, the response time of the gyroscope is improved by the radar signals.

FIG. 3 is a schematic illustration more fully indicating the interconnections and illustrating a portion of the computer 33. If, for example, the device is contained in an aircraft, the pilot may be situated to view the radar indicator and the optical sighthead from point 34 during a tracking maneuver. As the aircraft turns, the gyro rotor 1 will deflect providing a reticle on plate 10 which is displaced to give an optical lead angle. The capacitor plates 22, 23, 35 and 36 (not shown) provide output signals indicating the amount of deflection of rotor 1. The output signals from capacitor plates 22 and 23 are connected in a bridge circuit with resistors 37 and 38 which is excited by an A.-C. source 39. The output of the bridge circuit is taken on line 40 and passed to amplifier 41 to drive servo motor 42 and control the elevation of antenna 31. The servo loop is completed by resolver 43 indicating the elevation of antenna 31 and providing a feedback signal through resistor 44 to amplifier 41. This provides a closed loop servo control of the elevation of antenna 31 according to the output signal of gyro sighthead 30. The radar antenna is in this manner slaved in elevation to the optical projection system of the gyro sighthead. The output from capacitor plates 35 and 36 (not shown) is connected in a bridge circuit to resistors 45 and 46, which are excited by an A.-C. source 47 which may be the same or different from source 39. The output signal from the bridge circuit is taken on line 48, transmitted to amplifier 49, and then to servo motor 50 which controls the azimuth of antenna 31. Closed loop servo control is obtained by feeding back a signal from resolver 51, through resistor 52 to the input to amplifier 49. Antenna 31, therefore, is slaved to follow the optical projection system of the gyro computing sighthead 30 in azimuth. Radar receiver and transmitter 32 provides outgoing signals to feed horn 53. The returning radar signals are likewise received in feed horn 53 and received at radar receiver and transmitter 32. The output signals from the radar receiver, that is, range, elevation error and azimuth error, are provided on lines 54, 55 and 56, and sent to computer 33. Range coil 13 of the gyro computing sighthead 30 is fed with a signal which varies as an inverse function of range, that is, as range gets larger the range signal sent to coil 13 gets smaller. A signal representing an inverse function of range, $$\sqrt{\frac{V_o}{R}}$$

is desired, where $V_o$ is defined as a predetermined value representing the relative projectile velocity with respect to the aircraft, and R is defined as the range to the target. Motor 57 receives the range signal and rotates its shaft according to $$\sqrt{\frac{V_o}{R}}$$

This is accomplished by a potentiometer 76 connected in negative feedback. Potentiometer 76 is wound non-linearly so that the motor will rotate according to the inverse of the range signal received. The potentiometer 58 is linearly wound and has a D.-C. source applied thereto. It is driven by motor 57 so that the range signal $$\sqrt{\frac{V_o}{R}}$$

is received at amplifier 59. The output of amplifier 59 is sent to range coil 13 of gyro computing sighthead 30. The computing sighthead then is controlled in its deflection according to this function which is an inverse function of range. Other, more precise computer methods of obtaining inverse range functions may be used. The elevation error received by the radar is passed to computer 33 and is sent through resistor 60 to potentiometer 61 whose wiper is adjusted by range motor 57. Thus the elevation error signal is modified by the inverse function of the range. Amplifier 62 receives the output of potentiometer 61 and passes the elevation offset signal to vertical deflection coils 14 and 15.

The elevation offset signal sent to amplifier 62

$$\sqrt{\frac{V_o}{R}}(E_1)$$

may be desired to be modified according to various other fire control factors, such as the amount of drop of the projectile caused by gravity. This may be determined from a vertical gyro which provides an output signal which indicates the portion of the gravity vector acting on the missile to be fired. The vertical gyro 63 provides the gravity-drop signal $G_{el}$, to resistor 64 whose output is connected to the output of resistor 60 to make this modification. The elevation offset signal might be further desirably modified by still another fire control factor, such as the angle of attack obtained from an angle of attack vane 65 mounted in the air stream of the airplane, which provides signals from a resolver 66 indicating the angle of attack, $\alpha$, to amplifier 67. Resistor 68 receives this signal, which is then combined with signals from resistors 60 and 64. This makes the elevation offset signal, $E_L$, as follows:

$$E_L = \sqrt{\frac{V_o}{R}}(k_1 E_1 + k_2 \alpha + G_{el}) \qquad (1)$$

where $k_1$ and $k_2$ are predetermined constants and are provided by the relative values of resistors 60, 64 and 68.

The azimuth error signal is received from the radar receiver 32 and is transmitted through resistor 70 to potentiometer 71 whose wiper is adjusted by range motor 57. The gravity component, $G_{az}$, which effects the azimuth error is received from vertical gyro 63 through resistor 72. Amplifier 73 receives the output of the wiper potentiometer 71 and passes an azimuth offset signal to the azimuth deflection coils 18 and 19 (not shown) of gyroscopic sighthead 30. The azimuth offset signal is as follows:

$$E_{az} = \sqrt{\frac{V_o}{R}}(k_3 E_2 + G_{az}) \qquad (2)$$

where $k_3$ is a predetermined constant and is provided by the relative values of resistors 70 and 72.

In substance, the gyroscopic sighthead is used to stabilize and direct the radar antenna. The electrical signals produced by the radar system indicating the target elevation and azimuth errors and range are used to control the gyro. A closed servo loop, as indicated in FIG. 2, is accomplished in which the dynamic characteristics of both the gyro sighthead and the radar system are improved. A pilot then observing from point 34 in FIG. 3 is better able to place the reticle projected at plate 10 on the target and the error dot illustrated on the indicator 74 in the center of the indicator as is desired. In addition to improved stability and improved dynamic characteristics, the device provides a fire control system with all-weather and nighttime capability.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In combination, a gyroscopic sighthead including a case and a gyroscope deflectably mounted thereto and deflectable relative to the case upon reorientation of the sighthead to follow a target, radar system means including an antenna providing output signals representing target range, antenna elevation error and antenna azimuth error, a computer connected to receive output signals of said radar system and provide signals representing said error signals weighted inversely with range, means for causing deflection of said gyroscope, said last mentioned means connected to receive the output of said computer.

2. In a fire control system, a sighthead comprising a case and a deflectably mounted gyroscope which is deflectable relative to the case upon reorientation of the sighthead, a radar system having an antenna and providing signals representing target range, antenna azimuth error and antenna elevation error, means for directing said radar antenna in response to deflection of said gyroscope of said sighthead, a computer connected to receive the signals from said radar system representing range, antenna azimuth error, and antenna elevation error, said computer providing signals including signals representing the products of said antenna azimuth error and antenna elevation error and an inverse function of range, means for causing deflection of said gyroscope, said last mentioned means connected to receive the output signals of said computer.

3. In a fire control system, a sighthead comprising a case and a deflectably mounted gyroscope which is deflectable relative to the case upon reorientation of the sighthead and a reticle controlled by the deflection of said gyroscope, means for causing deflection of said gyroscope, a radar system including an antenna providing output signals representing target range, antenna azimuth error, and antenna elevation error, a computer connected to receive the output signals of said radar system and provide output signals including said signals representing antenna azimuth error and antenna elevation error multiplied by an inverse function of said range signal, said means for causing deflection of said gyroscope connected to receive the output signals of said computer.

4. The combination recited in claim 3 wherein said computer comprises first means for summing signals representing gravity and angle of attack with said signal representing antenna elevation error and second means for summing signals representing gravity with said signal representing antenna azimuth error and said computer further comprises means for multiplying the outputs of said first and second summing means by said signal representing an inverse function of range.

5. In combination, a gyroscopic sighthead including a case and a gyroscope deflectably mounted thereto and deflectable relative to the case upon reorientation of the sighthead to follow a target, a radar including an orientably mounted antenna providing signals indicating target range, antenna elevation error and antenna azimuth error, means for orienting said radar antenna in response to deflection of said gyroscope, means for diminishing deflection response of said gyroscope, means responsive to said radar range signals for providing signals representing an inverse function of target range, said means for diminishing being responsive to said signals representing an inverse function of target range, and further means for causing deflection of said gyroscope in accordance with said antenna azimuth error signals and antenna elevation error signals provided by said radar.

6. In combination, a sighthead comprising a case and a deflectably mounted gyroscope which is deflectable relative to the case upon reorientation of the sighthead, pickoff means providing signals indicating deflection of said gyroscope relative to the case, torquing means for causing deflection of said gyroscope, a radar including an orientably mounted antenna for providing signals representing target range, antenna elevation error and antenna azimuth error, servo means connected to orient said antenna, said servo means responsive to the signals provided by said pickoff means on said gyroscope, and means connecting the output signals of said radar to said torquing means.

7. In combination, a sighthead comprising a case and a deflectably mounted gyroscope which is deflectable relative to the case upon reorientation of the sighthead, at least first and second means for causing deflection of said gyroscope, elevation pickoff means providing signals indicating the deflection of said gyroscope relative to the case in elevation, azimuth pickoff means providing signals indicating the deflection of said gyroscope relative to the case in azimuth, a radar system including an orientably mounted antenna for providing range and antenna azimuth and elevation error signals, servo means connected to orient said antenna in elevation according to the signal provided by said elevation pickoff means, servo means connected to orient said antenna in azimuth according to the signals provided by said azimuth pickoff means, computer means connected to receive the signals provided by said radar system and provide in response thereto an elevation offset signal and an azimuth offset signal to said first and second means for controlling the deflection of said gyroscope, respectively, said offset signals being proportional to said error signals and to the square root of the reciprocal of said range signal.

8. The combination recited in claim 7 wherein said sighthead further comprises means for diminishing the deflection response of said gyroscope, and wherein said last mentioned means is connected to receive a signal proportional to the square root of the reciprocal of said range signal.

9. A sighthead comprising a case and a deflectably mounted gyroscope which is deflectable relative to the case upon reorientation of the sighthead, said gyroscope having an elevation deflection coil, an azimuth deflection coil, an elevation pickoff, and an azimuth pickoff, a radar system including an orientably mounted antenna providing signals representing target range, antenna elevation error, and antenna azimuth error, servo means for orienting said radar antenna in elevation according to signals provided by said elevation pickoff on said gyroscope, servo means for orienting said antenna in azimuth according to the signals provided by said azimuth pickoff on said gyroscope, a computer connected to receive the signals of said radar system representing target range, antenna elevation error and antenna azimuth error signal, said computer comprising means providing a signal representing the inverse square root of the range signal received from said radar receiver, said computer comprising means for multiplying each of said elevation error signal and said azimuth error signal by said signal representing inverse square root, and means for connecting said multiplied elevation error signal and multiplied azimuth error signal to said elevation and azimuth deflection coils, respectively.

10. The combination recited in claim 9 wherein is included in said sighthead a range coil, said range coil being connected to receive the output signal of said computer representing the inverse square root of range signal.

11. In combination, a gyroscopic sighthead including a case and a gyroscope deflectably mounted thereto and deflectable relative to the case upon reorientation of the sighthead to follow a target, a radar system having an orientably mounted antenna and providing output signals representing angular error of the aim of said antenna relative to a target, means responsive to deflection of said gyroscope relative to the case for causing the orientation of said antenna to follow the orientation of the gyroscope, and means responsive to said output signals of said radar system for deflecting said gyroscope relative to the case.

12. In combination, a gyroscope sighthead including a case and a gyroscope deflectably mounted thereto and deflectable relative to the case upon reorientation of the sighthead to follow a target, a radar system having an orientable antenna and providing output signals representing target range and antenna angular error, means responsive to deflection of said gyroscope relative to the case for slaving the orientation of said antenna to the orientation of the gyroscope, computer means responsive to said radar system for generating control signals proportional to said angular error and inversely proportional to target range, and means responsive to said control signals for deflecting said gyroscope.

13. In a sighthead comprising a gyroscope, a range coil, an elevation deflection coil, an azimuth deflection coil, an elevation pickoff, and an azimuth pickoff, a radar system providing signals representing target range, antenna elevation error and antenna azimuth error, said radar system comprising cooperatively connected radar antenna, a radar transmitter, and a radar receiver, servo means for directing said radar antenna in elevation according to signals provided by said elevation pickoff on said gyroscope, servo means for directing said antenna in azimuth according to signals provided by said azimuth pickoff of said gyroscope, computing means connected to receive the output range signal, elevation error signal and azimuth error signal from said radar receiver, said computer means comprising means providing a signal including the inverse square root of the range signal received from said radar receiver, means providing a signal representing angle of attack, means for adding said angle of attack signal to said elevation error signal, means for multiplying the sum of said elevation error signal and said angle of attack signal by said signal including the inverse range function, and means for multiplying said azimuth error signal by said signal including inverse range function, and means for connecting said multipled elevation error signal and angle of attack signal to said elevation deflection coil, means for connecting said multipled azimuth error signal to said azimuth deflection coil, and said range coil being connected to receive the output signal of said computer including the inverse range function.

14. In a sighthead comprising a gyroscope, a range coil, an elevation deflection coil, an azimuth deflection coil, an elevation pickoff, an azimuth pickoff, a radar system providing signals representing target range, antenna elevation error and antenna azimuth error, said radar system comprising a cooperatively connected radar antenna, a radar transmitter and a radar receiver, servo means for directing said radar antenna in elevation according to signals provided by said elevation pickoff of said gyroscope, servo means for directing said antenna in azimuth according to the azimuth pickoff of said gyroscope, computing means connected to receive the target range signal, elevation error signal and azimuth error signal from said radar receiver, said computer means comprising means providing a signal representing the inverse square root of the range signal received from said radar receiver, a vertical gyro providing signals indicating the azimuth gravity-drop and elevation gravity-drop, means for summing the elevation gravity-drop signal from said vertical gyro to said elevation error signal, means for multiplying output of said summing means by said signal representing inverse range function, and means for connecting said multiplied signal to said elevation deflection coil, means for summing the azimuth gravity-drop output signal of said vertical gyroscope and said azimuth error signal, means for multiplying the output of said immediately previous summing means by said signal representing inverse range function, and means for connecting said multiplied signal of said immediately previous means to said azimuth deflection coil.

15. The combination recited in claim 14 wherein is included means providing a signal indicating the angle of attack and said signal is connected to be summed with said elevation gravity-drop signal from said vertical gyro and said elevation error signal.

References Cited in the file of this patent
UNITED STATES PATENTS

| | | |
|---|---|---|
| 2,467,831 | Johnson | Apr. 19, 1949 |
| 2,707,400 | Manger | May 3, 1955 |
| 2,715,776 | Knowles | Aug. 23, 1955 |
| 2,733,066 | Babcock | Jan. 31, 1956 |
| 2,742,812 | Evans | Apr. 24, 1956 |

UNITED STATES PATENT OFFICE
CERTIFICATE OF CORRECTION

Patent No. 3,034,116                                May 8, 1962

Rulon G. Shelley

It is hereby certified that error appears in the above numbered patent requiring correction and that the said Letters Patent should read as corrected below.

Column 2, lines 69 and 70, for "sight, head" read -- sighthead, --; column 4, line 28, for "functions" read -- function --; column 8, line 52, for "2,733,066" read -- 2,733,006 --.

Signed and sealed this 31st day of March 1964.

(SEAL)
Attest:

ERNEST W. SWIDER
Attesting Officer

EDWARD J. BRENNER

Commissioner of Patents